United States Patent
Sano (10) Patent No.: US 8,224,080 B2
(45) Date of Patent: Jul. 17, 2012

(54) IMAGE PICKUP APPARATUS, IMAGE RECORDING PROGRAM, IMAGE DATA RECORDING MEDIUM, IMAGE PROCESSING APPARATUS, AND IMAGE PROCESSING PROGRAM

(75) Inventor: Hisashi Sano, Tokyo (JP)

(73) Assignee: Nikon Corporation, Tokyo (JP)

( * ) Notice: Subject to any disclaimer, the term of this patent is extended or adjusted under 35 U.S.C. 154(b) by 1204 days.

(21) Appl. No.: 12/007,238

(22) Filed: Jan. 8, 2008

(65) Prior Publication Data
US 2008/0170794 A1 Jul. 17, 2008

(30) Foreign Application Priority Data
Jan. 16, 2007 (JP) .................. 2007-007394

(51) Int. Cl.
*G06K 9/36* (2006.01)
*G06T 9/00* (2006.01)
(52) U.S. Cl. ..................................... 382/166
(58) Field of Classification Search .................. 382/166, 382/162; 358/539
See application file for complete search history.

(56) References Cited

U.S. PATENT DOCUMENTS
2004/0008885 A1* 1/2004 Caldato et al. ................ 382/166
2007/0046690 A1* 3/2007 Madden et al. ............... 345/590

FOREIGN PATENT DOCUMENTS
| JP | A-06-109545 | 4/1994 |
| JP | A-08-046989 | 2/1996 |
| JP | A-2000-347786 | 12/2000 |
| JP | A-2003-287733 | 10/2003 |
| JP | A-2005-507588 | 3/2005 |
| WO | WO 03/036982 A2 | 5/2003 |

OTHER PUBLICATIONS

Jun. 14, 2011 Office Action issued in Japanese Patent Application No. 2007-007394 (with English Translation).
International Standard, IEC 61966-2-2, First Edition, Multimedia Systems and Equipment—Colour Measurement and Management—, Part 2-2: Colour Management—Extended RGB Colour Space—scRGB (2003).

* cited by examiner

*Primary Examiner* — Jon Chang
(74) *Attorney, Agent, or Firm* — Oliff & Berridge, PLC (57) ABSTRACT

An image pickup apparatus is provided that allows image data to represent colors within the human visible region adequately. The apparatus includes an encoding part which encodes a color of each of pixels forming an image represented by image data that are input from an image pickup part, using an excitation purity and either a dominant wavelength or a complementary wavelength that are determined in a color space capable of representing an entire visible region based on a predetermined reference point within a visible region and a locus of a visible light spectrum in the color space, and which outputs obtained encoded data.

14 Claims, 7 Drawing Sheets

Fig. 1
BLOCK DIAGRAM ILLUSTRATING ONE EMBODIMENT OF A DIGITAL CAMERA

Fig. 2
FLOW-CHART ILLUSTRATING AN ENCODED DATA GENERATION OPERATION

Fig. 3
GRAPH FOR ILLUSTRATING A PARAMETER CALCULATING OPERATION

Fig. 4
CHART FOR ILLUSTRATING AN EXAMPLE OF THE FORMAT OF CODE DATA

(a)

(b)

(c)

(d)

Fig. 5
GRAPH FOR ILLUSTRATING A PARAMETER CALCULATING OPERATION

Fig. 6
BLOCK DIAGRAM ILLUSTRATING ONE EMBODIMENT OF AN IMAGE PROCESSING APPARATUS

Fig. 7
FLOW-CHART ILLUSTRATING AN IMAGE DATA REPRODUCING OPERATION

IMAGE PICKUP APPARATUS, IMAGE RECORDING PROGRAM, IMAGE DATA RECORDING MEDIUM, IMAGE PROCESSING APPARATUS, AND IMAGE PROCESSING PROGRAM

CROSS-REFERENCE TO RELATED APPLICATION

This application is based upon and claims the benefit of priority from Japanese Patent Application No. 2007-007394, filed on Jan. 16, 2007, the entire contents of which are incorporated herein by reference.

BACKGROUND

1. Field

The present invention relates to an image pickup apparatus including a digital camera, an image data recording medium for recording image data that are output from the image pickup apparatus, and an image processing apparatus for executing processes including displaying and printing of image data, as well as an image recording program and an image processing program for executing an image data processing.

2. Description of the Related Art

An image pickup apparatus such as a digital camera generates image data representing the colors of pixels by carrying out an interpolating process for electric signals that correspond to R, G, B components obtained in an image pickup device, taking into consideration the characteristics of the image pickup device, the characteristics of the filters, and the characteristics of the display device. After undergoing an encoding process according to the JPEG format or the like, the image data are recorded into a recording medium such as a memory card.

In the process of this encoding, the image data including R, G, B signals obtained by the interpolating process are encoded after they have been converted into a signal system that is compatible with an encoding process (for example, Y, Cb, Cr signals). On the other hand, when reproducing the encoded image data and displaying the image through a display device, the just-mentioned Y, Cb, Cr signals are again converted into R, G, B signals.

The conversion process in this picture reproduction is executed according to the sRGB standard concerning the characteristics of a standard display, which is specified by IEC (International Electrotechnical Commission), assuming that the image is reproduced by a display that conforms to the sRGB standard.

The color gamut specified by the sRGB standard, however, does not cover the entire human visible region, so there exist colors that are within the human visible region but are not contained in the color gamut specified by the sRGB standard. Since such colors cannot be expressed by the image data that conform to the sRGB standard, such colors are approximated by colors within the color gamut specified by the sRGB standard.

In order to avoid such a limitation of the color gamut of the sRGB standard, a technique has been developed that enables a wider color gamut to be reproduced by adding a color profile in which wider color gamut characteristics are described as display characteristics to the image data and carrying out the conversion into R, G, B signals based on this color profile.

On the other hand, the scRGB standard, which is an extended version of the sRGB standard, is also specified by the IEC (see the non-patent reference 1). The color gamut of the scRGB standard covers the human visible region entirely, but at the same time, it can also define the outside of the visible region, in other words, the points in the range in which humans do not recognize as "colors."

[Non-patent Reference 1] INTERNATIONAL STANDARD IEC 61966-2-2

The above-mentioned method in which a color profile is added to image data enables the entire visible region to be represented by combinations of R, G, B components by setting the points corresponding to the chromaticities of primary colors (R, G, B) which represent color gamut characteristics to be outside the visible region. At the same time, however, it allows the points outside the visible region to be defined also as "colors," as in the case of the scRGB standard.

For such "colors" that are defined outside the visible region, no clear guideline has yet been presented as to how they should be handled in the process of outputting them through a display device or a printer. For this reason, there is a risk that some confusion may be caused in the processing stage of the image data when the image data is represented by whichever method.

In either of the cases, a value range that can be defined but is not utilized as effective data representing actual colors is produced because a data region is allocated to a region outside the visible region as well as the inside of the visible region.

SUMMARY

It is an object of the invention to provide an image pickup apparatus, an image recording program, an image data recording medium, an image processing apparatus, and an image processing program that output image data that can represent colors within the human visible region adequately.

It is another object of the invention to provide an image pickup apparatus and an image data recording program that generate image data in the format in which all the colors within the visible region can be represented without defining colors outside the visible region, and that supply the data to a recording process into a recording medium such as a memory card.

It is yet another object of the invention to provide an image data recording medium that records image data in the just-mentioned format and supplies the data to the processes in personal computers, printers, and the like.

It is still another object of the invention to provide an image processing apparatus and an image processing program that faithfully reproduces the colors intended by the user who records the image by reproducing colors represented by image data in the above-described format using the entire visible region and supplying the data to an output process through a display device or a printer device.

One of the foregoing objects is accomplished by an image pickup apparatus including an encoding part which encodes a color of each of pixels forming an image represented by image data that are input from an image pickup part, using an excitation purity and either one of a dominant wavelength and a complementary wavelength that are determined in a color space capable of representing a entire visible region based on a predetermined reference point within the visible region and a locus of a visible light spectrum in the color space, and which outputs obtained encoded data.

One of the foregoing objects is accomplished by an image pickup apparatus as described above in which the encoding part includes a first parameter calculating part calculating either a dominant wavelength or a complementary wavelength and an excitation purity that correspond to each pixel, based on the reference point being set within the visible region in the color space, and a wavelength parameter forming part forming a wavelength parameter from values obtained by the first parameter calculating part and a determination flag indicating whether the value is one of a dominant wavelength and a complementary wavelength.

One of the foregoing objects is accomplished by an image pickup apparatus as described above in which the encoding part includes a second parameter calculating part calculating a dominant wavelength and an excitation purity that correspond to each pixel, based on a reference point being set on a purple boundary connecting a long wavelength-side end point and a short wavelength-side end point of the locus of the visible light spectrum in the color space.

One of the foregoing objects is accomplished by any one of the above-described image pickup apparatus in which the encoding part adds data indicating the reference point and the locus of the visible light spectrum used for the encoding concerning a color of each pixel to the encoded data, and outputs resulting data.

One of the foregoing objects is accomplished by an image pickup apparatus as described above in which the encoding part associates the range of one of the dominant wavelength and the complementary wavelength and the range of excitation purity that are obtained in the encoding with an entire range of numerical values that are representable by a code length.

One of the foregoing objects is accomplished by the second one of the above-described image pickup apparatus in which the encoding part associates a range of the complementary wavelength restricted by the reference point being set within the visible region and the locus of the visible light spectrum in the color space with an entire range of numerical values that are representable by a code length indicating a parameter value.

One of the foregoing objects is accomplished by the first one of the image pickup apparatus as described above in which the encoding part includes a chromaticity converting part converting image data that are input, into coordinate data on an x,y chromaticity diagram, and a calculating part calculating either one of a dominant wavelength and a complementary wavelength and an excitation purity based on the coordinate data and information concerning a coordinate of the reference point and the locus of the visible light spectrum.

One of the foregoing objects is accomplished by any one of the above-described image pickup apparatus, in which the encoding part forms image data by adding a parameter indicating a brightness to encoded data corresponding to the color of each pixel, and outputs the formed image data.

Another one of the foregoing objects is accomplished by an image data recording medium including encoded data recorded therein, in which image data representing an image serving as a visual object are encoded using a parameter including at least one of a dominant wavelength and a complementary wavelength each being indicated by an intersection point of a linear line connecting a predetermined reference point within a visible region in a color space capable of representing an entire visible region and a point representing a color of each of pixels forming the image represented by the image data in the color space, and a locus of a visible light spectrum in the color space, and an excitation purity of the color of each of pixels concerning one of the dominant wavelength and complementary wavelength.

Yet another one of the foregoing objects is accomplished by an image processing apparatus including a decoding part reproducing a chromaticity representing a color of each of pixels forming an image from encoded data including code information corresponding to a parameter including an excitation purity and either one of a dominant wavelength and a complementary wavelength corresponding to a point on a locus of a visible light spectrum in a color space capable of representing an entire visible region.

DETAILED DESCRIPTION OF THE EMBODIMENTS

Hereinbelow, embodiments of the invention will be described in detail with reference to the accompanying drawings.

Embodiment of Digital Camera

Figure 1:
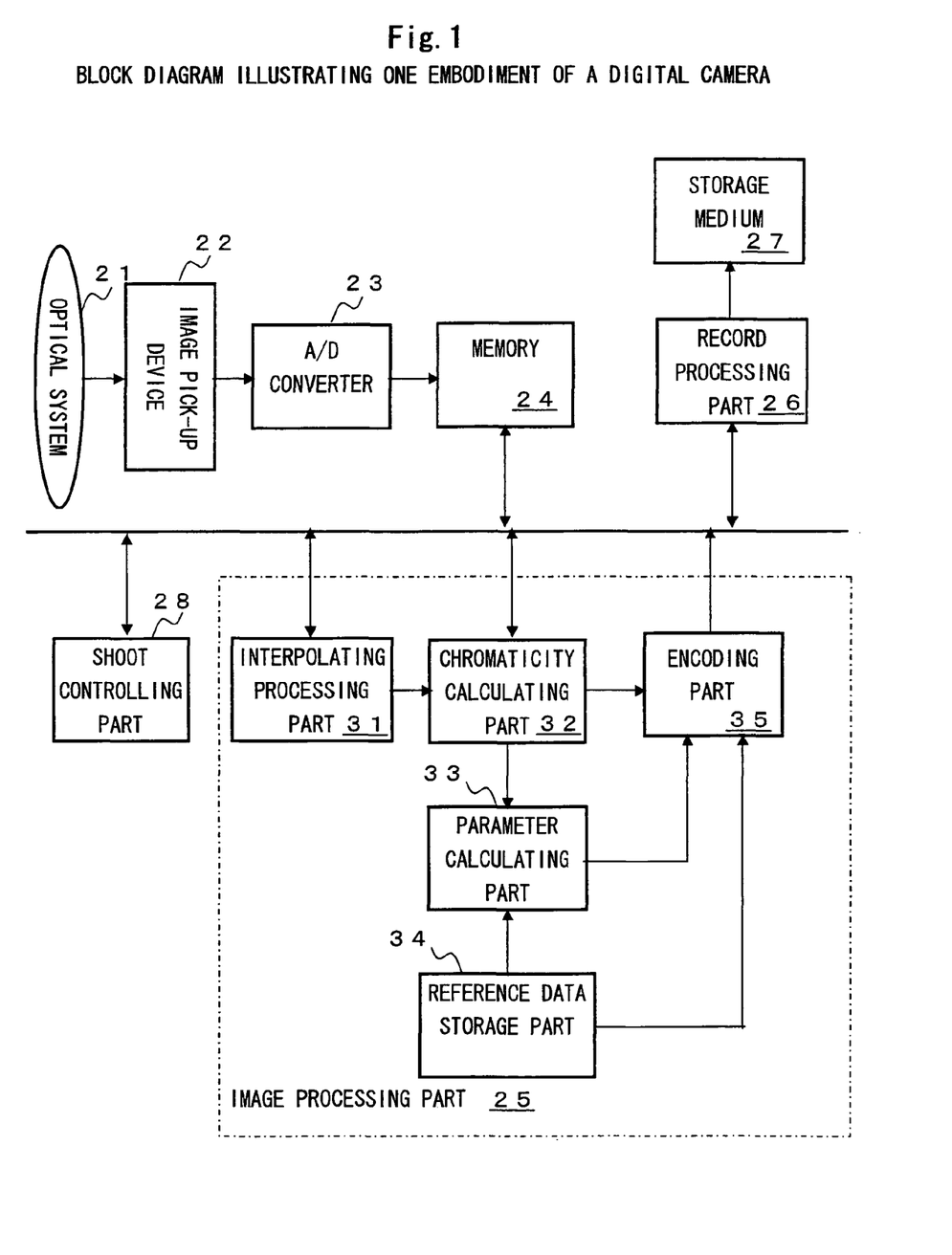
FIG. 1 is a block diagram illustrating one embodiment of a digital camera according to the invention.

FIG. 1 shows an embodiment of a digital camera.

In a digital camera shown in FIG. 1, the light imaged on an image pickup device 22 by a shoot optical system 21 at the time of shooting an image is converted into an electric signal according to the intensity by the image pickup device 22. The electric signal is further converted into digital data by an analog/digital (A/D) converter 23, and the data is stored in a memory 24.

The memory 24 shown in FIG. 1 is connected to an image processing part 25, a record processing part 26, and a shoot controlling part 28 via a bus. The digital data stored in the memory 24 is subjected to an image process including an encoding process by an image processing part 25. Compressed image data obtained as a result of the image processing is passed to the record processing part 26 via a bus, and is recorded in a storage medium 27. The operations of these parts are controlled by a shoot controlling part 28.

Hereinbelow, a process for generating coded data from the digital data obtained by the shooting will be described in detail.

Figure 2:
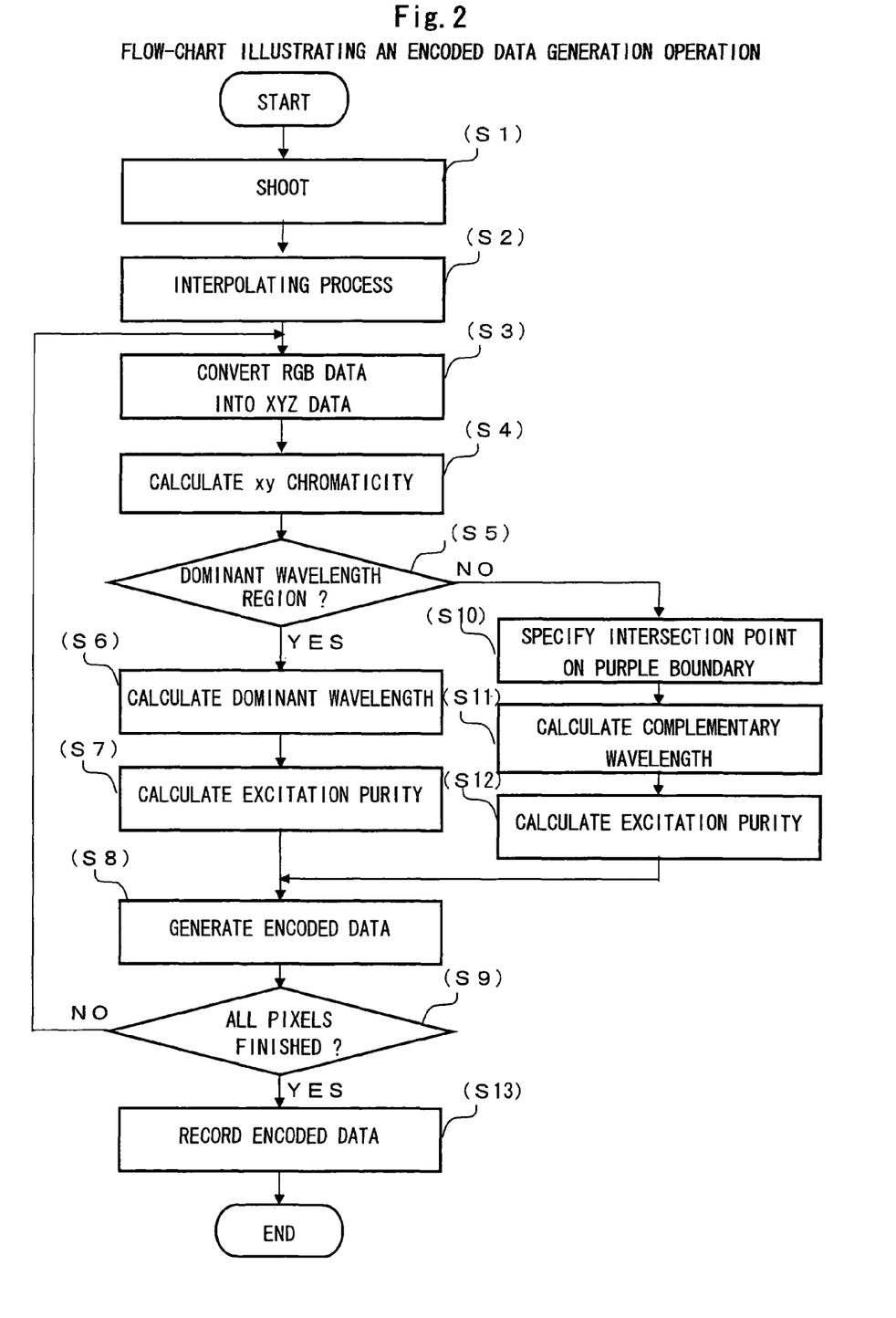
FIG. 2 is a flow-chart illustrating an encoded data generation operation.

FIG. 2 shows a flow-chart illustrating an encoded data generation operation.

The digital data obtained by the shooting shown in step S1 are supplied to an interpolating process by an interpolating processing part 31 provided in the image processing part 25 shown in FIG. 1 via the memory 24 (step S2), and thereby, image data represented by combinations of R, G, B components are obtained.

First, the image data of the pixels are converted into XYZ data that represent CIE tristimulus values by a chromaticity calculating part 32 shown in FIG. 1 using a common conversion equation (step S3), and then, chromaticities x, y are calculated (step S4) using the following equations (1) and (2).

$$x = X/(X+Y+Z) \tag{1}$$

$$y = Y/(X+Y+Z) \tag{2}$$

In addition, in the processes of step S3 or step S4, brightness Y of each pixel is determined based on RGB data or XYZ data and is passed to an encoding part 35.

Here, a coordinate W ($x_w$, $y_w$) indicating D65 chromaticity, which is one of the standard illuminants, in the x,y chromaticity diagram and chromaticity coordinate data indicating the locus of spectrum light in the x,y chromaticity diagram (see FIG. 3) are stored in a reference data storage part 34 in the image processing part 25 shown in FIG. 1. The chromaticity coordinate data can be realized by retaining respective chromaticity coordinates of the spectrum lights sampled at every 5 nm over a wavelength range of 380 nm to 700 nm, for example (for example, see Mitsuo Ikeda, "Shikisai Kougaku no Kiso [Basics of Color Engineering]," published by Asakura Shoten). It should be noted that in the above-described example, the chromaticity coordinate data corresponding to the spectrum lights having wavelengths of 380 nm to 700 nm are stored in the reference data storage part 34 since the chromaticity coordinates corresponding to the spectrum lights having wavelengths of 700 nm to 780 nm result in the same point.

Here, the quantities of such as dominant wavelength, complementary wavelength, and excitation purity are commonly calculated based on a white point. However, the techniques that will be described below can accomplish its objectives not only when the white point, which serves as the reference for calculating such quantities, is a so-called white color such as an equi-energy spectrum and D65 but also as long as it is within the visible light region. Moreover, an embodiment that uses a point on the purple boundary, which is not called a white color usually, as the white point in the calculation of such quantities to obtain a particular effect is also included, as will be described later.

For these reasons, this specification employs the term "reference point" instead of what is called "white point." In addition, a reference point is used as a white point in calculating dominant wavelength, complementary wavelength, and excitation purity.

In the following description, referring to FIG. 3, the region enclosed by the locus of spectrum light, the line segment connecting a reference point W and a long wavelength-side end point (which is designated by reference character R in FIG. 3) on the locus of the spectrum light, and the line segment connecting the reference point W and a short wavelength-side end point (which is designated by reference character V in FIG. 3) on the locus of the spectrum light is referred to as a dominant wavelength region. A triangular region enclosed by the just-described two line segments and the purple boundary, which connects both ends of the locus of the spectrum light is referred to as a complementary wavelength region.

Based on the xy chromaticity coordinate (x, y) obtained in the above-mentioned step S4, a parameter calculating part 33 shown in FIG. 1 determines whether or not this chromaticity coordinate (x, y) is contained in the dominant wavelength region (step S5).

Figure 3:
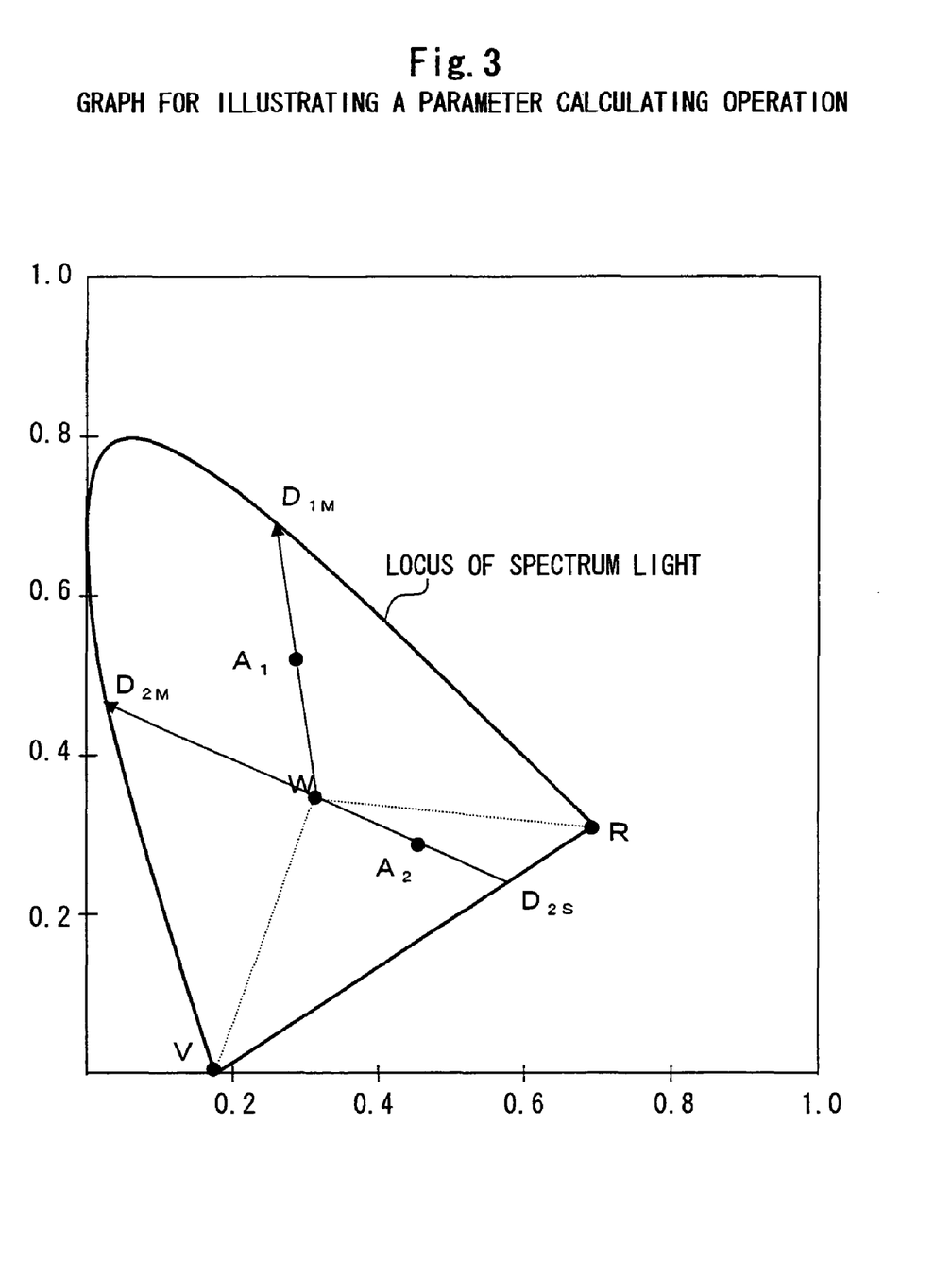
FIG. 3 is a graph for illustrating a parameter calculating operation.

For example, if it is determined that the point $A_1$ shown in FIG. 3 is contained within the dominant wavelength region (positive determination at step S5), then the parameter calculating part 33 calculates dominant wavelength $WL_M$ and excitation purity Pe as the parameters representing the color indicated by the chromaticity coordinate ($x_{a1}$, $y_{a1}$) of the point $A_1$ (steps S6 and S7).

First, the parameter calculating part 33 shown in FIG. 1 obtains the intersection point of the locus of the spectrum light and the linear line connecting the point $A_1$ and the reference point W from the chromaticity coordinate ($x_{a1}$, $y_{a1}$) of the point $A_1$ and the chromaticity coordinate ($x_w$, $y_w$) of the reference point W, and passes the wavelength corresponding to this intersection point to the encoding part 35 as a dominant wavelength $WL_M$.

Specifically, the parameter calculating part 33 obtains the equation of the just-described linear line (for example, y=px+q), and searches chromaticity coordinate data ($x_k$, $y_k$), ($x_{k+1}$, $y_{k+1}$) such that the products of respective differences between the respective values (i.e., $px_i+q$, $px_{i+1}+q$) obtained by substituting x coordinates $x_i$, $x_{i+1}$, of two adjacent points in the locus of spectrum light, among the chromaticity coordinate data indicating the locus of the spectrum light, into the equation of the linear line and the respective y coordinates $y_i$, $y_{i+1}$, of the just-mentioned two points become negative. Then, by obtaining the intersection point of the linear line connecting the points on the locus of the spectrum light that are indicated by the two chromaticity coordinate data obtained by this search and the linear line connecting the point $A_1$ and the reference point W (for example, y=px+q), it is possible to obtain, as the coordinate of the above-mentioned intersection point, the coordinate of the intersection point (designated by reference characters $D_{1M}$ in FIG. 3) of the linear line connecting the point $A_1$ and the reference point W and the locus of the spectrum light and to obtain a dominant wavelength $WL_M$ corresponding thereto. In addition, excitation purity Pe can be obtained by dividing the distance from the reference point W to the point $A_1$ by the distance from the reference point W to the intersection point $D_{1M}$.

In this way, the parameter calculating part 33 shown in FIG. 1 can determine the dominant wavelength $WL_M$ and the excitation purity Pe as the parameters representing the colors of respective pixels, and it passes these parameters to the encoding part 35.

Next, the encoding part 35 forms code data containing the dominant wavelength $WL_M$ and excitation purity Pe that have been received from the parameter calculating part 33 and the brightness Y that has been passed from the chromaticity calculating part 32 (step S8), and determines whether or not the process has been completed for all the pixels (step S9). If a negative determination is made in this step S9, the program returns to step S3 and starts the process for the next pixel.

For example, if the pixel of the next process object is contained within the complementary wavelength region as indicated by reference symbol $A_2$ in FIG. 3, the foregoing negative determination in step S5 results, and the parameter calculating part 33 executes the processes of step S10 to step S12.

First, the parameter calculating part 33 obtains the equation of the linear line connecting the reference point W and a point $A_2$ to be encoded, and calculates the chromaticity coordinate of the intersection point $D_{2S}$ of this linear line and the line segment connecting both ends of the locus of the spectrum light (purple boundary) (step S10).

Next, the parameter calculating part 33 obtains the intersection point $D_{2M}$ of the linear line connecting the reference point W and the point $A_2$ to be encoded and the locus of the spectrum light in the same manner as in the above-described step S6 and sets the wavelength corresponding to this intersection point $D_{2M}$ as a complementary wavelength $WL_S$. In addition, the parameter calculating part 33 calculates the excitation purity Pe concerning the point $A_2$ to be encoded, by dividing the distance from the reference point W to the point $A_2$ by the distance from the reference point W to the intersection point $D_{2S}$ (steps S11 and S12).

The complementary wavelength $WL_S$ and the excitation purity Pe obtained in this manner are passed to the encoding part 35 and supplied to the code data generation process of step S8.

Figure 4:
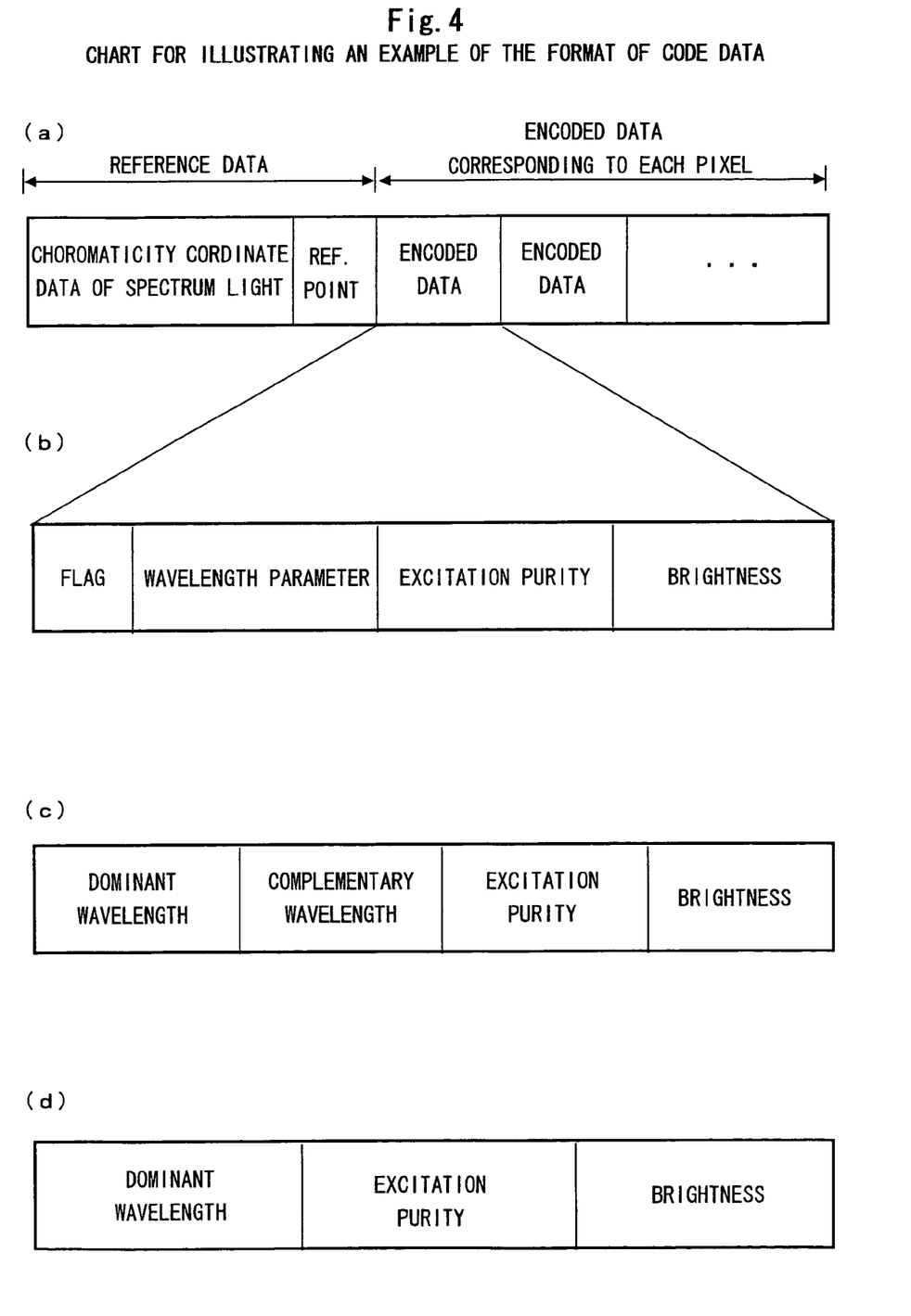
FIG. 4 is a chart for illustrating an example of the format of code data.

In step S8, the encoding part 35 can form code data corresponding to each of the pixels from, for example, as illustrated in FIG. 4(b), a wavelength parameter WL indicating the wavelength, a determination flag indicating whether the wavelength parameter is a dominant wavelength or a complementary wavelength, a brightness Y, and an excitation purity Pe.

At this time, the codes corresponding to the values of the wavelength parameter WL and the excitation purity Pe are determined in such a manner that the upper limit and the lower limit of the range of wavelength parameter WL (from 380 nm to 700 nm) and the upper limit and the lower limit of the range of excitation purity Pe (numerical values from 0 to 1) match the upper limit and the lower limit of the numerical value range that can be represented by the code length allocated to wavelength parameter WL and excitation purity Pe. Thereby, it becomes possible to utilize the entire numerical value range in which the code data can represent adequately and represent all the colors within the visible region.

In addition, it is also possible to allow the limit of the wavelength range concerning the complementary wavelength to reflect the determination of code data when the wavelength parameter WL indicates a complementary wavelength. Specifically, it is also possible to determine each of the codes by associating the upper limit and the lower limit of the complementary wavelength range, which are defined by the wavelengths corresponding to the intersection points of the locus of spectrum light and the respective extension lines of the line segments that connect the reference point W and the end points R, V of the locus of spectrum light (indicated by the dashed lines in FIG. 3) with the upper limit and the lower limit of the numerical values that can be represented by the code length allocated to wavelength parameter WL.

After the process has been completed for all the pixels in this way (positive determination in step S9), the encoding part 35 forms code data that correspond to the image data for one frame by adding, as illustrated in FIG. 4(a), reference data containing the chromaticity coordinate data indicating the locus of spectrum light and the chromaticity coordinate of the reference point W to the code data that correspond to the pixels for one frame. The code data are recorded via the record processing part 26 into the storage medium 27 such as a memory card (step S13).

It should be noted that it is possible to omit the addition of the reference data containing such information when the chromaticity coordinate data indicating the locus of spectrum light and the chromaticity coordinate data indicating the reference point are shared among the display device, the printer apparatus, and so forth that output the image based on the encoded image data in a manner as described above.

Alternatively, as illustrated in FIG. 4(c), it is possible to form code data containing a dominant wavelength, a complementary wavelength, an excitation purity, and a brightness that correspond to each of the pixels. In this case, the encoding part 35 sets a code corresponding to the wavelength parameters obtained by the parameter calculating part 33 in the field corresponding to the dominant wavelength or in the field corresponding to the complementary wavelength in the code data, depending on whether the color of each pixel is within the dominant wavelength region or within the complementary wavelength region.

Figure 5:
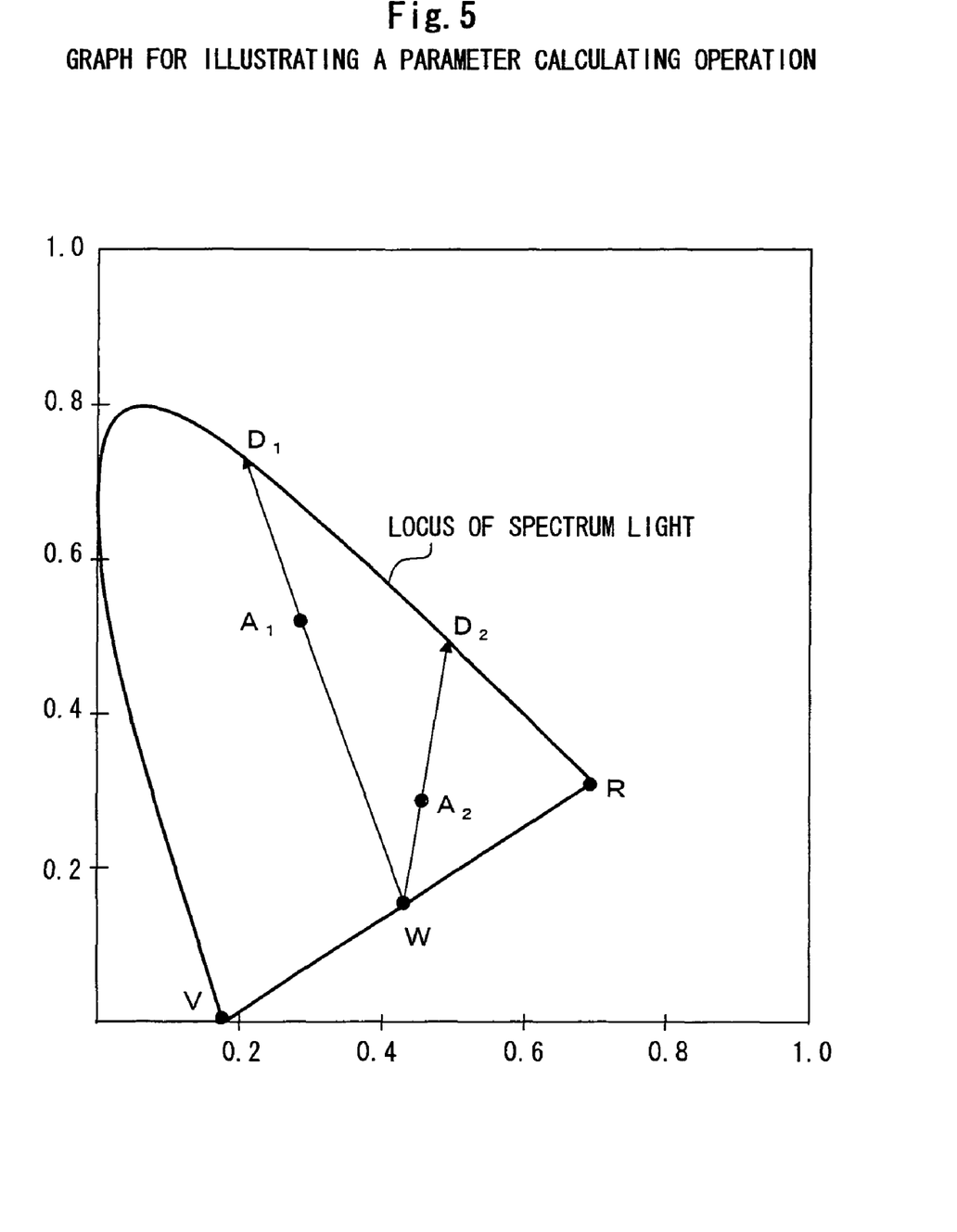
FIG. 5 is a graph for illustrating a parameter calculating operation.

On the other hand, when the reference point W is set on the purple boundary, which connects both ends of the locus of spectrum light as illustrated in FIG. 5, the dominant wavelength on the locus of spectrum light and the excitation purity can be obtained for the chromaticity coordinates that represent all the colors contained in the visible region.

Therefore, in this case, the color of each pixel can be represented by a combination of the dominant wavelength and the excitation purity, as illustrated in FIG. 4(d).

The process for generating code data that represent each of the pixels using either the dominant wavelength or the complementary wavelength and the excitation purity from the RGB data obtained by an image pickup process using an image pickup device in such a manner as described above can be realized by software. Such software is applicable not only to the RGB data obtained in taking photographs by a digital camera but also to the image data obtained by a photometer and the image data accumulated in an image database.

Embodiment of Image Processing Apparatus

Figure 6:
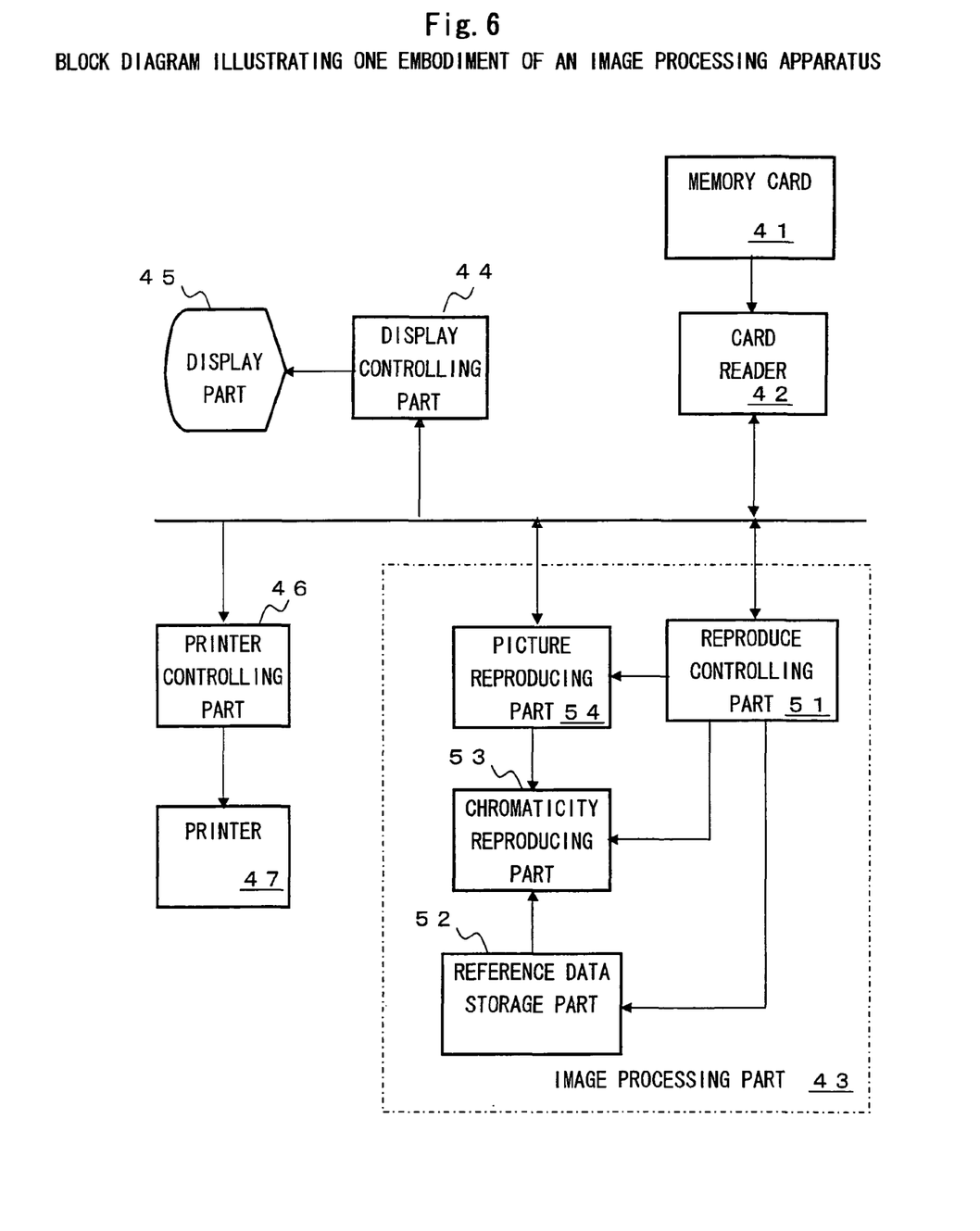
FIG. 6 is a block diagram illustrating an embodiment of an image processing apparatus according to the invention.

FIG. 6 shows an embodiment of an image processing apparatus.

A memory card 41 shown in FIG. 6 stores image files containing the above-described encoded data according to the format as shown in FIG. 4. A card reader 42 reads out a designated image file from the memory card 41 in response to an instruction from a reproduce controlling part 51 provided in an image processing part 43, and supplies it to the process of the image processing part 43.

Hereinbelow, a description will be given of a method for reproducing image data from the image file having the above-described configuration by this image processing part 43.

Figure 7:
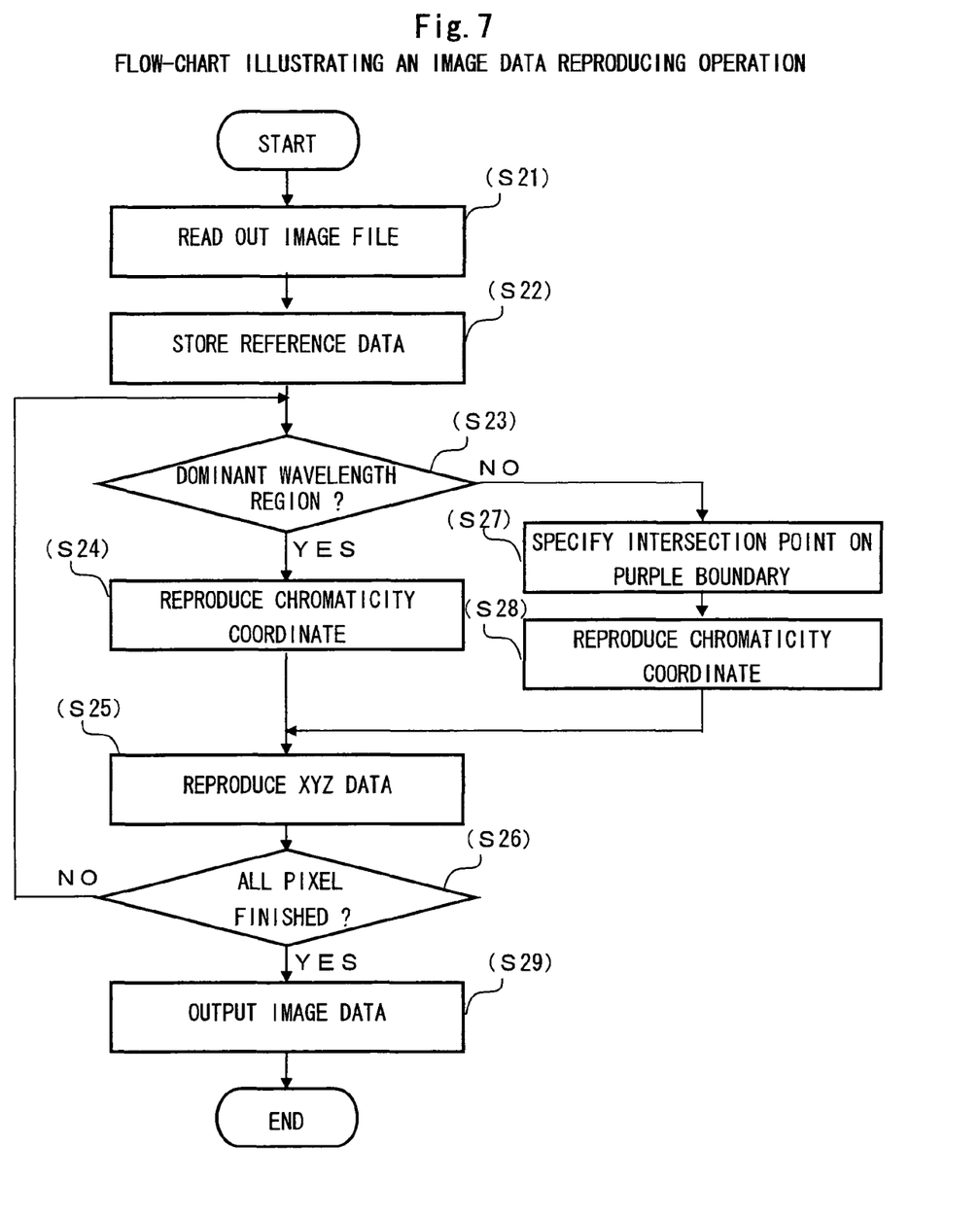
FIG. 7 is a flow-chart illustrating a image data reproducing operation.

FIG. 7 shows a flow-chart illustrating an image data reproducing operation.

In the image processing part 43 shown in FIG. 6, first, the reproduce controlling part 51 reads out an image file via the card reader 42 (step S21), then extracts reference data from the received image file, and stores the reference data into a reference data storage part 52 (step S22).

Among the code data corresponding to each of the pixels that constitute the image file, the determination flag, the wavelength parameter, and the excitation purity are passed to a chromaticity reproducing part 53 and the brightness is passed to a picture reproducing part 54 via the reproduce controlling part 51.

If the determination flag indicates the dominant wavelength region (positive determination at step 23 in FIG. 7), the chromaticity reproducing part 53 shown in FIG. 6 obtains, based on the chromaticity coordinate corresponding to the dominant wavelength indicated by the wavelength parameter and the chromaticity coordinate of the reference point W, the equation of the linear line connecting these points, and it reproduces the chromaticity coordinate indicating the color of the pixel represented by the code data from the equation of the linear lines and the excitation purity (step S24).

On the other hand, if the determination flag indicates the complementary wavelength region (negative determination at step 23 in FIG. 7), the chromaticity reproducing part 53 shown in FIG. 6 obtains, based on the chromaticity coordinate corresponding to the dominant wavelength indicated by the wavelength parameter and the chromaticity coordinate of the reference point W, the equation of the linear line connecting these points, and it identifies the chromaticity coordinate of the intersection point of this the linear line and the purple boundary (step S27). Next, the chromaticity reproducing part 53 reproduces the chromaticity coordinate indicating the color of the pixel represented by the code data, based on the chromaticity coordinate identified at step 27, the excitation purity, and the chromaticity coordinate of the reference point W (step S28).

Based on the chromaticity coordinate reproduced in this way and the brightness received from the reproduce controlling part 51, the picture reproducing part 54 reproduces XYZ data for reproducing the color of the applicable pixel, including its brightness (step S25).

After the XYZ data have been reproduced from the code data corresponding to all the pixels by repeating the above-described steps S23 through S28 (positive determination at step S26), an image data generating part 54 outputs the XYZ data for one flame to a bus to supply the data to the output process by a display 45 or a printer 47 via a display controlling part 44 or a printer controlling part 46 (step S29).

The XYZ data supplied to the process of the display controlling part 44 or the printer controlling part 46 in the above-described manner are limited to be within the visible light region entirely, and therefore, it becomes clear how the data should be converted when the data need to be converted into display data for displaying by the display 45 or output data for outputting by the printer 47.

It should be noted that when the reference data used for generating the image file is shared by the reference data storage part 52 provided in the image processing part 43 in advance, it is possible to omit the above-described step S22 and carry out the reproduce process of xy chromaticity coordinates using the shared reference data.

In addition, when the reference point W indicated by the reference data is a point on the purple boundary, the xy chromaticity coordinates can be reproduced by the process of the above-described step S24 from the code data corresponding to all the pixels.

The image pickup apparatus, the image recording program, the image data recording medium, the image processing apparatus, and the image processing program that are configured by applying the above-described techniques allow all the colors within the visible region to be represented. Moreover, they do not define code data outside the visible region, and therefore, it is unnecessary to take the code data that cannot be displayed or printed into consideration.

In other words, by employing the above-described encoding method of image data, a high consistency can be achieved between the range of colors within the visible region and the range of code data used for recording images, and a clear interpretation is made possible for the code data used for recording an image.

As has been described above, the image pickup apparatus, the image recording program, the image data recording medium, the image processing apparatus and the image processing program that are configured by applying the above-described techniques enable any color within the visible region to be represented without taking the data representing outside of the visible region into consideration. Therefore, they are remarkably useful in the fields of printing of catalogs and posters or digitization of works of art, in which delicate color representation is required.

The many features and advantages of the embodiments are apparent from the detailed specification and, thus, it is intended by the appended claims to cover all such features and advantages of the embodiments that fall within the true spirit and scope thereof. Further, since numerous modifications and changes will readily occur to those skilled in the art, it is not desired to limit the inventive embodiments to the exact construction and operation illustrated and described, and accordingly all suitable modifications and equivalents may be resorted to, falling within the scope thereof.

What is claimed is:

1. An image pickup apparatus comprising:
an encoding part which encodes a color of each of pixels forming an image represented by image data that are input from an image pickup part, using either one of a dominant wavelength and a complementary wavelength and an excitation purity that are determined, in a color space capable of representing an entire visible region, based on a predetermined reference point within the visible region and a locus of a visible light spectrum in said color space, and which outputs obtained encoded data, wherein
said encoding part comprises:
a parameter calculating part calculating either one of a dominant wavelength and a complementary wavelength and an excitation purity that correspond to each pixel, based on the reference point being set within the visible region in said color space; and
a wavelength parameter forming part forming a wavelength parameter from a value obtained by said parameter calculating part and a determination flag indicating whether said value is one of a dominant wavelength and a complementary wavelength.

2. The image pickup apparatus according to claim 1, wherein
said encoding part associates a range of the complementary wavelength restricted by the reference point being set within the visible region and said locus of the visible light spectrum in said color space with an entire range of numerical values that are representable by a code length indicating a parameter value.

3. An image pickup apparatus comprising:
an encoding part which encodes a color of each of pixels forming an image represented by image data that are input from an image pickup part, using either one of a dominant wavelength and a complementary wavelength and an excitation purity that are determined, in a color space capable of representing an entire visible region, based on a predetermined reference point within the visible region and a locus of a visible light spectrum in said color space, and which outputs obtained encoded data, wherein
said encoding part comprises a parameter calculating part calculating a dominant wavelength and an excitation purity that correspond to each pixel, based on the reference point being set on a purple boundary connecting a long wavelength-side end point and a short wavelength side-end point of said locus of the visible light spectrum in said color space.

4. An image pickup apparatus comprising:
an encoding part which encodes a color of each of pixels forming an image represented by image data that are input from an image pickup part, using either one of a dominant wavelength and a complementary wavelength and an excitation purity that are determined, in a color space capable of representing an entire visible region, based on a predetermined reference point within the visible region and a locus of a visible light spectrum in said color space, and which outputs obtained encoded data, wherein
said encoding part associates a range of one of the dominant wavelength and the complementary wavelength and a range of the excitation purity that are obtained in said encoding respectively with an entire range of numerical values that are representable by a code length.

5. A non-transitory computer-readable recording medium carrying an image recording program comprising:

an encoding operation of encoding a color of each of pixels forming an image represented by image data that are input from an image pickup part, using either one of a dominant wavelength and a complementary wavelength and an excitation purity that are determined, in a color space capable of representing an entire visible region, based on a predetermined reference point within the visible region and a locus of a visible light spectrum in said color space; and a recording operation of recording encoded data obtained by said encoding operation, wherein said encoding operation comprises:

a parameter calculating operation of calculating either one of a dominant wavelength and a complementary wavelength and an excitation purity that correspond to each pixel, based on a reference point being set within the visible region in said color space; and a wavelength parameter forming operation of forming a wavelength parameter from a value obtained by said parameter calculating part and a determination flag indicating whether said value is one of a dominant wavelength and a complementary wavelength.

6. A non-transitory computer-readable recording medium carrying the image recording program according to claim 5, wherein said encoding includes associating a complementary wavelength range restricted by a reference point being set within the visible region and said locus of the visible light spectrum in said color space respectively with an entire range of numerical values that are representable by a code length.

7. A non-transitory computer-readable recording medium carrying an image recording program comprising:

an encoding operation of encoding a color of each of pixels forming an image represented by image data that are input from an image pickup part, using either one of a dominant wavelength and a complementary wavelength and an excitation purity that are determined, in a color space capable of representing an entire visible region, based on a predetermined reference point within the visible region and a locus of a visible light spectrum in said color space; and a recording operation of recording encoded data obtained by said encoding operation, wherein said encoding operation comprises a parameter calculating operation of calculating a dominant wavelength and an excitation purity that correspond to each pixel, based on the reference point being set on a purple boundary connecting a long wavelength-side end point and a short wavelength side end point of said locus of the visible light spectrum in said color space.

8. A non-transitory computer-readable recording medium carrying an image recording program comprising:

an encoding operation of encoding a color of each of pixels forming an image represented by image data that are input from an image pickup part, using either one of a dominant wavelength and a complementary wavelength and an excitation purity that are determined, in a color space capable of representing an entire visible region, based on a predetermined reference point within the visible region and a locus of a visible light spectrum in said color space; and a recording operation of recording encoded data obtained by said encoding operation, wherein said encoding includes associating a range of one of the dominant wavelength and the complementary wavelength and a range of excitation purity that are obtained in said encoding with an entire range of numerical values that are representable by a code length.

9. An image data recording medium comprising:

encoded data recorded therein, including:

image data representing an image serving as a visual object, the image data being encoded using a parameter including: at least one of a dominant wavelength and a complementary wavelength each being indicated by an intersection point of a linear line connecting a predetermined reference point within a visible region in a color space capable of representing an entire visible region and a point representing a color of each of pixels forming the image represented by said image data in said color space, and a locus of a visible light spectrum in said color space; and an excitation purity of said color of each of pixels concerning one of said dominant wavelength and said complementary wavelength;

a wavelength parameter from a value obtained based on either one of a dominant wavelength and a complementary wavelength and an excitation purity that correspond to each pixel, based on the reference point being set within the visible region in said color space; and a determination flag indicating whether said value is one of a dominant wavelength and a complementary wavelength.

10. An image processing apparatus comprising:

a decoding part reproducing a chromaticity representing a color of each of pixels forming an image from encoded data, the encoded data comprising:

code information corresponding to a parameter including an excitation purity and either one of a dominant wavelength and a complementary wavelength corresponding to a point on a locus of a visible light spectrum in a color space capable of representing an entire visible region;

a wavelength parameter from a value obtained based on either one of a dominant wavelength and a complementary wavelength and an excitation purity that correspond to each pixel, based on the reference point being set within the visible region in said color space; and a determination flag indicating whether said value is one of a dominant wavelength and a complementary wavelength.

11. A non-transitory computer-readable recording medium carrying an image processing program comprising:

a decoding operation by reproducing a chromaticity representing a color of each of pixels forming an image from encoded data, the encoded data comprising:

code information corresponding to a parameter including an excitation purity and either one of a dominant wavelength and a complementary wavelength corresponding to a point on a locus of a visible light spectrum in a color space capable of representing an entire visible region;

a wavelength parameter from a value obtained based on either one of a dominant wavelength and a complementary wavelength and an excitation purity that correspond to each pixel, based on the reference point being set within the visible region in said color space; and a determination flag indicating whether said value is one of a dominant wavelength and a complementary wavelength.

12. An image data recording medium comprising:

encoded data recorded therein, including:

image data representing an image serving as a visual object, the image data being encoded using a parameter including: at least one of a dominant wavelength and a complementary wavelength each being indicated by an intersection point of a linear line connecting a predetermined reference point within a visible region in a color space capable of representing an entire visible region and a point representing a color of each of pixels forming the image represented by said image data in said color space, and a locus of a visible light spectrum in said color space; and an excitation purity of said color of each of pixels concerning one of said dominant wavelength and said complementary wavelength; and a value based on a dominant wavelength and an excitation purity that correspond to each pixel, based on the reference point being set on a purple boundary connecting a long wavelength-side end point and a short wavelength side-end port of said locus of the visible light spectrum in said color space.

13. An image processing apparatus comprising:

a decoding part reproducing a chromaticity representing a color of each of pixels forming an image from encoded data, the encoded data comprising:

code information corresponding to a parameter including an excitation purity and either one of a dominant wavelength and a complementary wavelength corresponding to a point on a locus of a visible light spectrum in a color space capable of representing an entire visible region; and a value based on a dominant wavelength and an excitation purity that correspond to each pixel, based on the reference point being set on a purple boundary connecting a long wavelength-side end point and a short wavelength side-end port of said locus of the visible light spectrum in said color space.

14. A non-transitory computer-readable recording medium carrying an image processing program comprising:

a decoding operation by reproducing a chromaticity representing a color of each of pixels forming an image from encoded data, the encoded data comprising:

code information corresponding to a parameter including an excitation purity and either one of a dominant wavelength and a complementary wavelength corresponding to a point on a locus of a visible light spectrum in a color space capable of representing an entire visible region; and a value based on a dominant wavelength and an excitation purity that correspond to each pixel, based on the reference point being set on a purple boundary connecting a long wavelength-side end point and a short wavelength side-end port of said locus of the visible light spectrum in said color space.

* * * * *